(12) United States Patent
Shigetomi et al.

(10) Patent No.: US 6,496,883 B2
(45) Date of Patent: *Dec. 17, 2002

(54) STORAGE MEDIUM HAVING ELECTRONIC CIRCUIT AND COMPUTER SYSTEM HAVING THE STORAGE MEDIUM

(75) Inventors: Takashi Shigetomi, Miyagi-ken (JP); Tetsuo Saito, Miyagi-ken (JP); Tsunematsu Komaki, Tokyo (JP)

(73) Assignee: Kabushiki Kaisha Optrom, Miyagi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/814,289

(22) Filed: Mar. 21, 2001

(65) Prior Publication Data

US 2001/0018723 A1 Aug. 30, 2001

Related U.S. Application Data

(62) Division of application No. 09/000,534, filed on Dec. 30, 1997, now Pat. No. 6,295,564.

(30) Foreign Application Priority Data

Jun. 18, 1997 (JP) .............................. 9-161665

(51) Int. Cl.⁷ .............................................. G06F 12/00
(52) U.S. Cl. ......................... 710/74; 235/492; 711/115
(58) Field of Search .................. 710/302, 301, 710/74; 235/380, 382, 492; 711/115

(56) References Cited

U.S. PATENT DOCUMENTS

| | | |
|---|---|---|
| 4,338,644 A | 7/1982 | Staar |
| 4,814,924 A | 3/1989 | Ozeki |
| 4,839,875 A | 6/1989 | Kuriyama et al. |
| 4,868,373 A | 9/1989 | Opheij et al. |
| 4,960,982 A | 10/1990 | Takahira |

(List continued on next page.)

FOREIGN PATENT DOCUMENTS

| | | |
|---|---|---|
| DE | 196 07 169 | 11/1996 |
| EP | 0 190 733 | 8/1986 |
| EP | 0 193 635 | 9/1986 |
| EP | 0 394 098 | 10/1990 |
| EP | 0 545 532 | 6/1993 |

(List continued on next page.)

OTHER PUBLICATIONS

"Magnetic Recording Disk With Silicon Substrate Disk Containing Both Integrated Electronic Circuits and Magnetic Media" IBM Technical Disclosure Bulletin, vol. 28, No. 7, Dec. 1985, pp. 2861–2862, XP002073271 New York, US.

IBM Journal TDB, Jun. 1992, pp. 311–314.

(List continued on next page.)

*Primary Examiner*—Glenn A. Auve
(74) *Attorney, Agent, or Firm*—Merchant & Gould P.C.

(57) ABSTRACT

A storage medium having an electronic circuit portion serves as a central unit, and a main body serves as a peripheral unit, so that a system using the storage medium can be arbitrarily constructed and a computer system having the storage medium, for example, a personal computer, a car navigation system, a multi-functional television set, or the like can be provided. In an intelligent disk having a disk portion for storing information and an electronic circuit portion for processing information, a program for controlling at least an external device as a peripheral device is stored in the disk portion, and the electronic circuit portion executes the program to control the external device as a peripheral device.

5 Claims, 12 Drawing Sheets

U.S. PATENT DOCUMENTS

| | | | |
|---|---|---|---|
| 5,036,461 A | 7/1991 | Elliott et al. | |
| 5,119,353 A | 6/1992 | Asakura | |
| 5,159,182 A | 10/1992 | Eisele | |
| 5,235,586 A | 8/1993 | Feamster et al. | |
| 5,276,572 A | 1/1994 | Kinoshita et al. | |
| 5,289,521 A | 2/1994 | Coleman et al. | |
| 5,423,054 A | 6/1995 | Schmidt et al. | |
| 5,533,125 A | 7/1996 | Bensimon et al. | |
| 5,546,585 A | 8/1996 | Soga | |
| 5,559,927 A | 9/1996 | Clynes | |
| 5,559,958 A | 9/1996 | Farrand et al. | |
| 5,584,043 A | 12/1996 | Burkart | |
| 5,634,111 A | 5/1997 | Oeda et al. | |
| 5,652,838 A | 7/1997 | Lovett et al. | |
| 5,663,553 A | 9/1997 | Aucsmith | |
| 5,734,787 A | 3/1998 | Yonemitsu et al. | |
| 5,737,549 A | 4/1998 | Hersch et al. | |
| RE35,839 E | 7/1998 | Asai et al. | |
| 5,793,714 A | 8/1998 | Inoue et al. | |
| 5,802,519 A | 9/1998 | DeJong | |
| 5,844,218 A | 12/1998 | Kawan et al. | |
| 5,856,659 A | 1/1999 | Drupsteen et al. | |
| 5,857,079 A | 1/1999 | Claus et al. | |
| 5,878,282 A | 3/1999 | Mital | |
| 5,889,657 A | 3/1999 | Kono | |
| 5,890,014 A | 3/1999 | Long | |
| 5,903,867 A | 5/1999 | Watari et al. | |
| 5,920,733 A | 7/1999 | Rao | |
| 5,930,823 A | 7/1999 | Ito et al. | |
| 5,936,226 A | 8/1999 | Aucsmith | |
| 5,940,363 A | 8/1999 | Ro et al. | |
| 5,951,687 A | 9/1999 | Chan et al. | |
| 5,999,698 A | 12/1999 | Nakai et al. | |
| 6,005,940 A | 12/1999 | Kulinets | |
| 6,021,306 A | 2/2000 | McTaggart | |
| 6,029,887 A | 2/2000 | Furuhashi et al. | |
| 6,044,046 A | 3/2000 | Diezmann et al. | |
| 6,295,564 B1 * | 9/2001 | Shigetomi et al. | 710/74 |

FOREIGN PATENT DOCUMENTS

| | | | | |
|---|---|---|---|---|
| EP | 0 569 593 | 11/1993 | | |
| EP | 0 662 674 | 7/1995 | | |
| EP | 0 671 741 | 9/1995 | | |
| EP | 0 710 955 | 5/1996 | | |
| EP | 0 756 274 | 1/1997 | | |
| EP | 0 809 245 | 11/1997 | | |
| JP | 61-286927 | 12/1986 | | |
| JP | 63-2130 | 1/1988 | | |
| JP | 63-7541 | 1/1988 | | |
| JP | 63-25791 | 2/1988 | | |
| JP | 63-25792 | 2/1988 | | |
| JP | 63-217569 | 9/1988 | | |
| JP | 1-127392 | 5/1989 | | |
| JP | 1-162286 | 6/1989 | | |
| JP | 1-263892 | 10/1989 | | |
| JP | 2-3132 | 1/1990 | | |
| JP | 2-5158 | 1/1990 | | |
| JP | 3-73481 | 3/1991 | | |
| JP | 4-304001 | 10/1992 | | |
| JP | 4-355818 | 12/1992 | | |
| JP | 4-356785 | 12/1992 | | |
| JP | 5-54460 | 3/1993 | | |
| JP | 5-258347 | 10/1993 | | |
| JP | 5-282771 | 10/1993 | | |
| JP | 6-36305 | 5/1994 | | |
| JP | 6-139747 | 5/1994 | | |
| JP | 6-295200 | 10/1994 | | |
| JP | 7-334637 | 12/1995 | | |
| JP | 8-123635 | 5/1996 | | |
| JP | 8-161790 | 6/1996 | | |
| JP | 8-212141 A * | 8/1996 | | G06F/12/14 |
| JP | 8-221945 | 8/1996 | | |
| JP | 9-34491 | 2/1997 | | |
| JP | 9-109803 | 4/1997 | | |
| JP | 9-126799 | 5/1997 | | |
| JP | 9-134330 A * | 5/1997 | | G06F/15/00 |
| TW | 289190 | 10/1996 | | |
| TW | 374913 | 11/1999 | | |
| WO | WO94/29852 | 12/1994 | | |
| WO | 96/29699 | 9/1996 | | |

OTHER PUBLICATIONS

Patent Abstract of Japan vol. 012, No. 140 (P–696), Apr. 28, 1988 for JP 62–262289A, Nov. 14, 1987.

Patent Abstract of Japan vol. 097, No. 005, May 30, 1997 & JP 09–017154A, Jan. 17, 1997.

Patent Abstract of Japan (JPA 09–245381).

Patent Abstract of Japan vol. 033 (P–334), Feb. 13, 1985 & JP59–175062A, Oct. 3, 1984.

* cited by examiner

F I G. 10
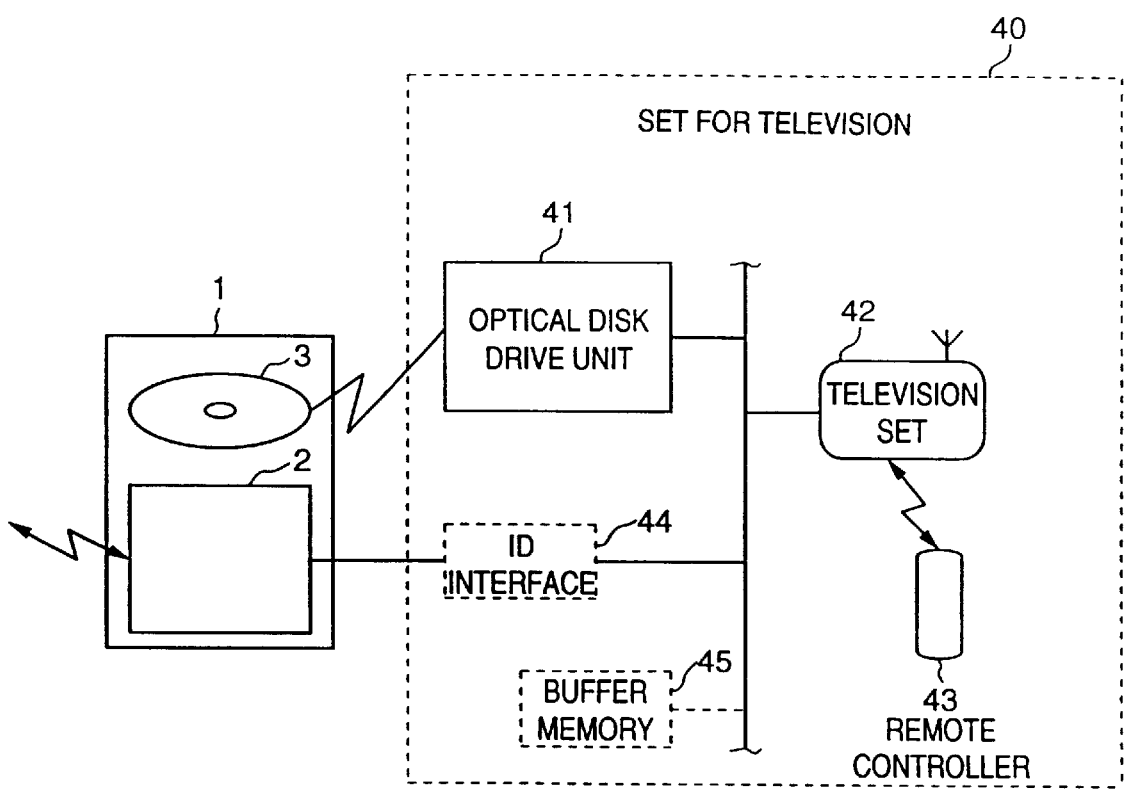

STORAGE MEDIUM HAVING ELECTRONIC CIRCUIT AND COMPUTER SYSTEM HAVING THE STORAGE MEDIUM

This application is a divisional of application Ser. No. 09/000,534, filed Dec. 30, 1997 now U.S. Pat. No. 6,295,564, which application(s) are incorporated herein by reference.

BACKGROUND OF THE INVENTION

1. Field of the Invention

The present invention relates to a storage medium having an information storage unit for storing information and an electronic circuit portion for processing information, e.g., an optical disk (to be referred to as an intelligent disk (ID) hereinafter; the term "ID" is not used as "IDentification" in this specification) or the like and, more particularly, to a computer system having the storage medium as a central unit.

2. Description of Related Art

Conventionally, a disk having a cartridge on which a memory or a CPU is mounted or an IC card having a processor constituted by a magnetic-stripe storage and a memory or a CPU has been proposed.

However, a storage media having such intelligent is used to assist a computer system or for transport information. In recent years, the storage media is used as only a peripheral unit of a computer system.

SUMMARY OF THE INVENTION

The present invention removes the drawback of the prior art and provides a computer system such as a personal computer, a car navigation system, or a multi-functional television set in which a storage medium having an electronic circuit portion serves as a central unit, and a main body serves as a peripheral unit, so that a system which is required by an owner of the storage medium can be arbitrarily constructed.

In order to solve this subject, a storage medium according to the present invention is a storage medium having an information storage unit for storing information and an electronic circuit portion for processing information, characterized in that a program for controlling at least an external device is stored in the information storage unit, and the electronic circuit portion has control means for executing the program to control the external device.

Here, the information storage unit stores a plurality of programs, and the electronic circuit further comprises determination means for determining the characteristics of the external device and selecting means for selectively executing the plurality of programs in correspondence with a determination result of the determination means. The information storage unit stores the plurality of programs, and the electronic circuit portion further comprises display instruction means for causing the external device to selectively display the plurality of programs and selecting means for selectively executing the plurality of programs in correspondence with selection instruction. The information storage unit further stores data used in the programs. The programs and/or data are stored as a not-overlapped structure such that the programs and/or data are separated in each part of function. The electronic circuit portion further comprises communication means for performing wireless communication with a host computer, and load means for downloading, when a desired program or data is not stored in the information storage unit, a program or data from the host computer through the communication means. The external device is an input/output device constituting a personal computer, and the programs include a system program and/or an application program. The external device is an input/output device constituting a car navigation system, the programs include a system program and/or an application program, and the data includes map data. The external device is an input/output device constituting a multi-functional smart card, the programs include a system program and/or an application program, and the data includes merchandise catalog data. The storage medium is an optical disk.

A computer system according to the present invention is a computer system including a storage medium having an information storage unit for storing information and an electronic circuit portion for processing information, and is characterized in that a program for controlling at least the computer system is stored in the information storage unit of the storage medium, and the electronic circuit portion of the storage medium has control means for executing the program to control the computer system.

The information storage unit stores the plurality of programs, and the electronic circuit portion further comprises determination means for determining the characteristics of the computer system and selecting means for selectively executing the plurality of programs in correspondence with a determination result of the determination means. The information storage unit stores the plurality of programs, and the electronic circuit portion further comprises display instruction means for causing the external device to selectively display the plurality of programs and selecting means for selectively executing the plurality of programs in correspondence with selection instruction. The information storage unit further stores data used in the programs. The programs and/or data are stored as a not-overlapped structure such that the programs and/or data are separated in each part of function. The electronic circuit portion further comprises communication means for performing wireless communication with a host computer, and load means for downloading, when a desired program or data is not stored in the information storage unit, the program or data from the host computer through the communication means. The computer system includes a personal computer, a car navigation system, and a multi-functional smart card. The storage medium is an optical disk.

Other objects and feature of the present invention will be apparent from the following drawings and detailed description of the preferred embodiment.

BRIEF DESCRIPTION OF THE DRAWINGS

FIG. 10 is a view showing an arrangement of an automatic selling and settlement system.

DETAILED DESCRIPTION OF THE PREFERRED EMBODIMENTS

Several embodiments according to the present invention will be described below with reference to the accompanying drawings. The embodiments described here are only exemplified to effectively use the present invention, and the present invention is not limited to these embodiments.

<Arrangement of ID according to Embodiment>

Figure 1:
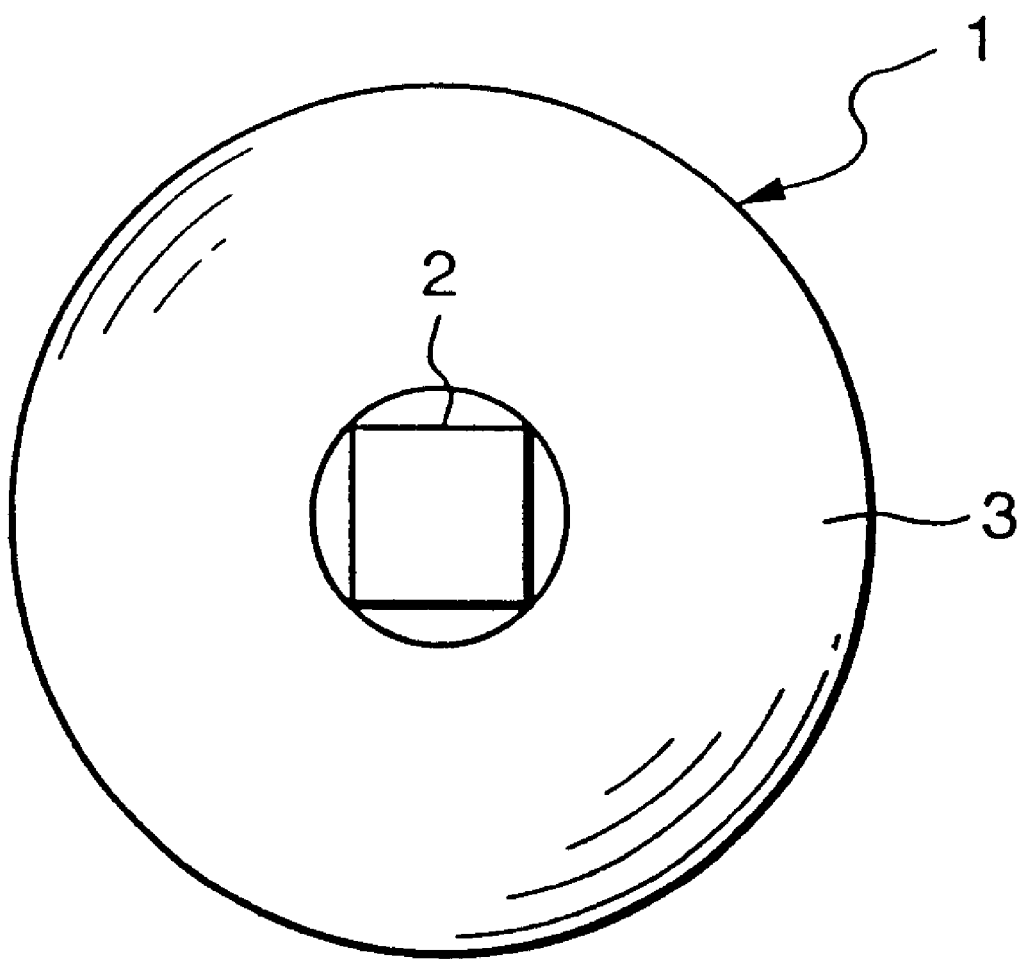
FIG. 1 is a view showing the appearance of an intelligent disk according to an embodiment of the present invention.

FIG. 1 is a view showing the appearance of an intelligent optical disk serving as a kind of ID according to this embodiment.

An ID 1 is constituted by a disk portion 3 serving as a disk surface on which information is stored, and an intelligent circuit portion 2 mounted at the central portion of the disk portion 3 as shown in FIG. 1, for example. However, this arrangement is not limited to a specific one. For example, the circuit portion 2 may occupy one surface of the disk, or the disk may be manufactured to have a plurality of layers, and the circuit portion 2 may be arranged on one of these layers.

Figure 2:
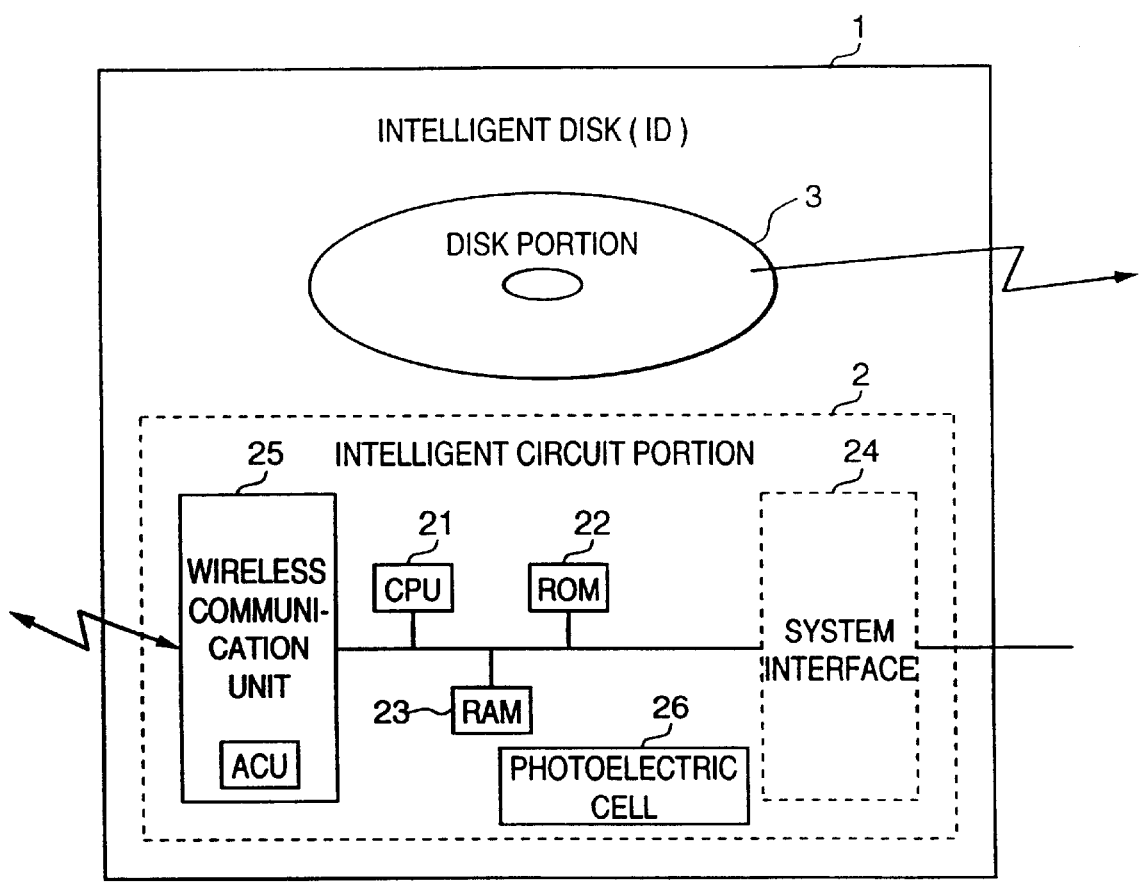
FIG. 2 is a view showing an arrangement of the intelligent disk according to the embodiment.

FIG. 2 is a view showing a concept arrangement of the ID1.

Referring to FIG. 2, the intelligent circuit portion 2 includes a ROM 22 for storing fixed information, a RAM 23 which is used as a temporarily used if necessary, and a CPU 21 for executing a program stored in the ROM 22 or the RAM 23. Reference numeral 26 denotes a photoelectric cell which is necessary when the ID has an independent power supply.

The intelligent circuit portion 2 exchanges information with an external device through a system interface 24. The connection point of the interface is of a contact type or a non-contact type, or bus coupling or communication coupling may be employed. As communication, wireless wave communication, optical communication, or the like may be used.

In addition, the ID according to this embodiment has a wireless communication unit 25, and also has a function of performing automatic dialing when information must be transmitted to an external device or when data or a program must be loaded from an external device.

The system interface 24 is indicated by a broken line for the following reason. That is, in particular, when this ID is used in a personal computer, bus coupling is preferably used as the coupling between the ID and the system in consideration of a data transfer rate and reliability. In this case, the system interface 24 can be omitted.

<Example of ID Constructing Personal Computer System>

Figure 3:
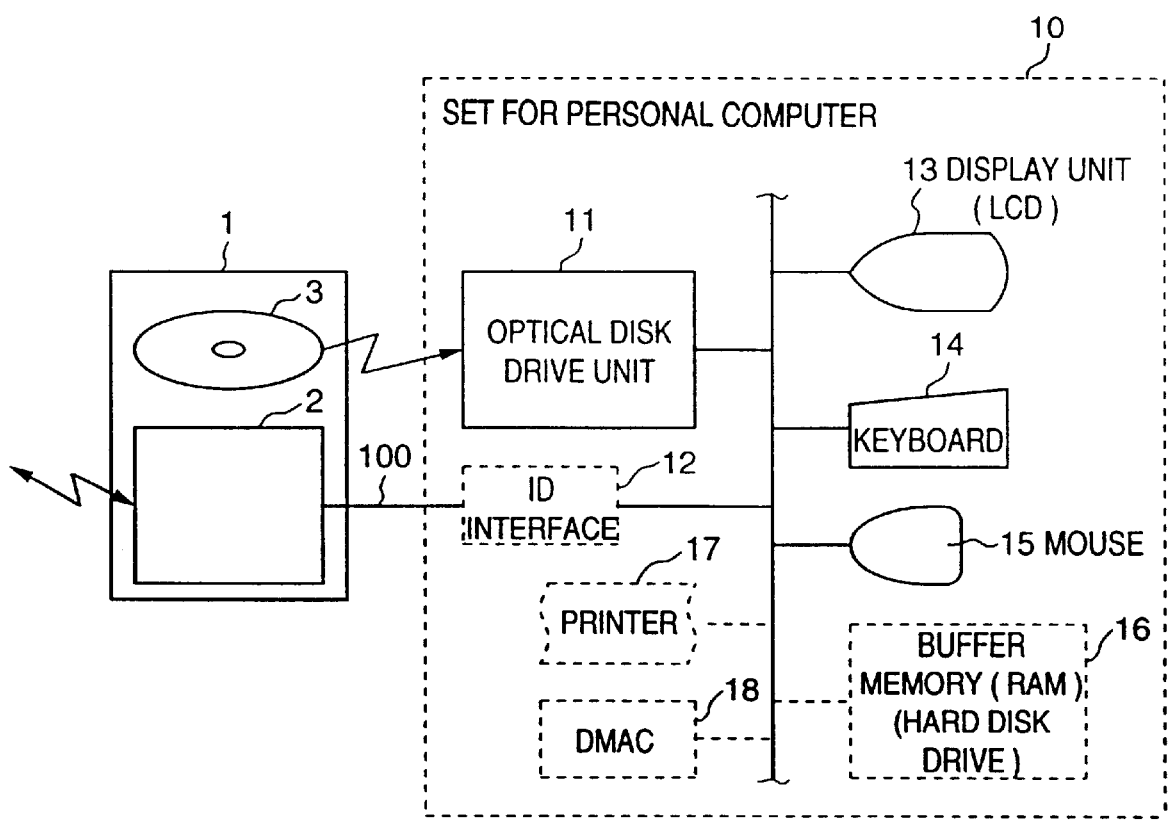
FIG. 3 is a view showing an arrangement of a personal computer system according to the embodiment.

FIG. 3 is a view showing an arrangement obtained when the ID according to this embodiment is used to construct a personal computer system.

Referring to FIG. 3, reference numeral 10 denotes set for a personal computer constituted by peripheral units which are bus-coupled to each other. In FIG. 3, the minimum necessary elements are indicated by sold lines, and additional elements which are not necessary are indicated by dashed lines.

As the necessary elements, an optical disk drive unit 11 including: a pick-up for reading (writing) data from the disk portion 3 of the ID of this example, a drive circuit portion for the pick-up, and the like; a display unit 13 (preferably an LCD) for displaying the conditions of the present system or information; a keyboard 14 (which can be replaced with a touch panel on the display unit 13) for inputting an instruction from a user; a mouse 15 (omitted in a portable personal computer) for inputting an instruction from the user like the keyboard 14; and the like are used.

As the elements which are not necessary, a buffer memory 16 (a RAM or a hard disk device may be used) for temporarily storing a program or data while the program or data is being transferred, a direct memory access controller (DMAC) 18 for independently performing data transfer at a high speed, a printer 17 for outputting a hard copy, and an ID interface 12 which is used in the bus coupling also described in the explanation of the ID.

In the above description, although the arrangement is explained as a set used as a personal computer, for example, a single-purpose device for a display of the display unit 1, a print output from a printer 7, storage of information in the hard disk device 16, or the like may be considered. However, in this case, the optical disk drive unit 11 is always a necessary element.

In this case, in order to improve a conventional device, matching between the system and the ID must be established through the ID interface 12 and the system interface 24. However, in the future, an interface (also in case of bus coupling) is preferably standardized such that any system can be easily coupled to any ID.

Although FIG. 3 shows only the system which is used as a peripheral device, the present invention can also be applied to an arrangement in which the system is used as one of conventional personal computers. This will be apparent from the following description of the procedure in FIG. 5.

Figure 4:
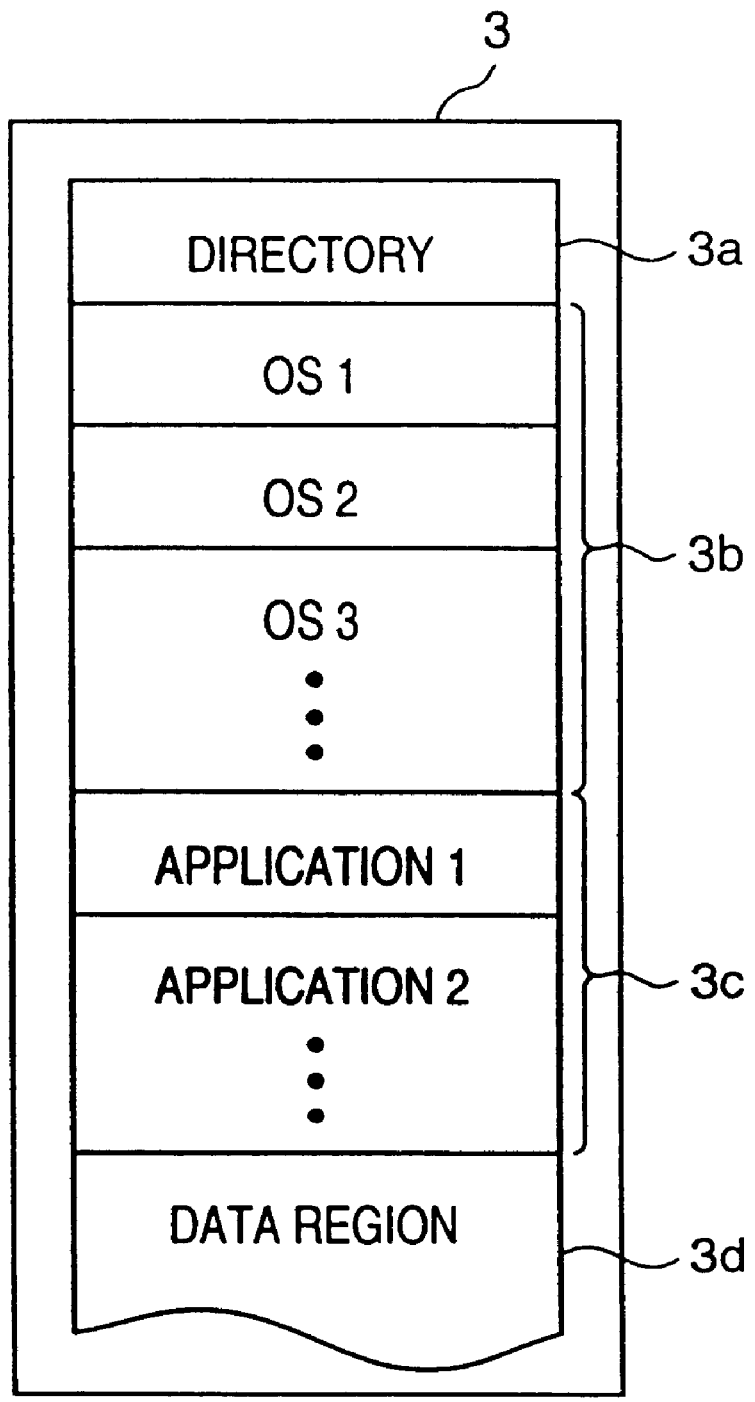
FIG. 4 is a view showing contents stored in the disk portion of the ID in the system in FIG. 3.

FIG. 4 shows an arrangement of information stored in the disk portion 3 of the ID when the present invention is constituted as a conventional personal computer.

A plurality of OSs (OS1, OS2, . . . ) 3b, a plurality of applications (application 1, application 2, . . . ) 3c, and data 3d are stored at respective positions pointed by a directory 3a. Though only one OS and/or one application may be stored, it is preferable that a plurality of OSs and applications are stored and a user selectively uses the OSs and the applications, to effectively use the ID of the present invention.

Figure 5:
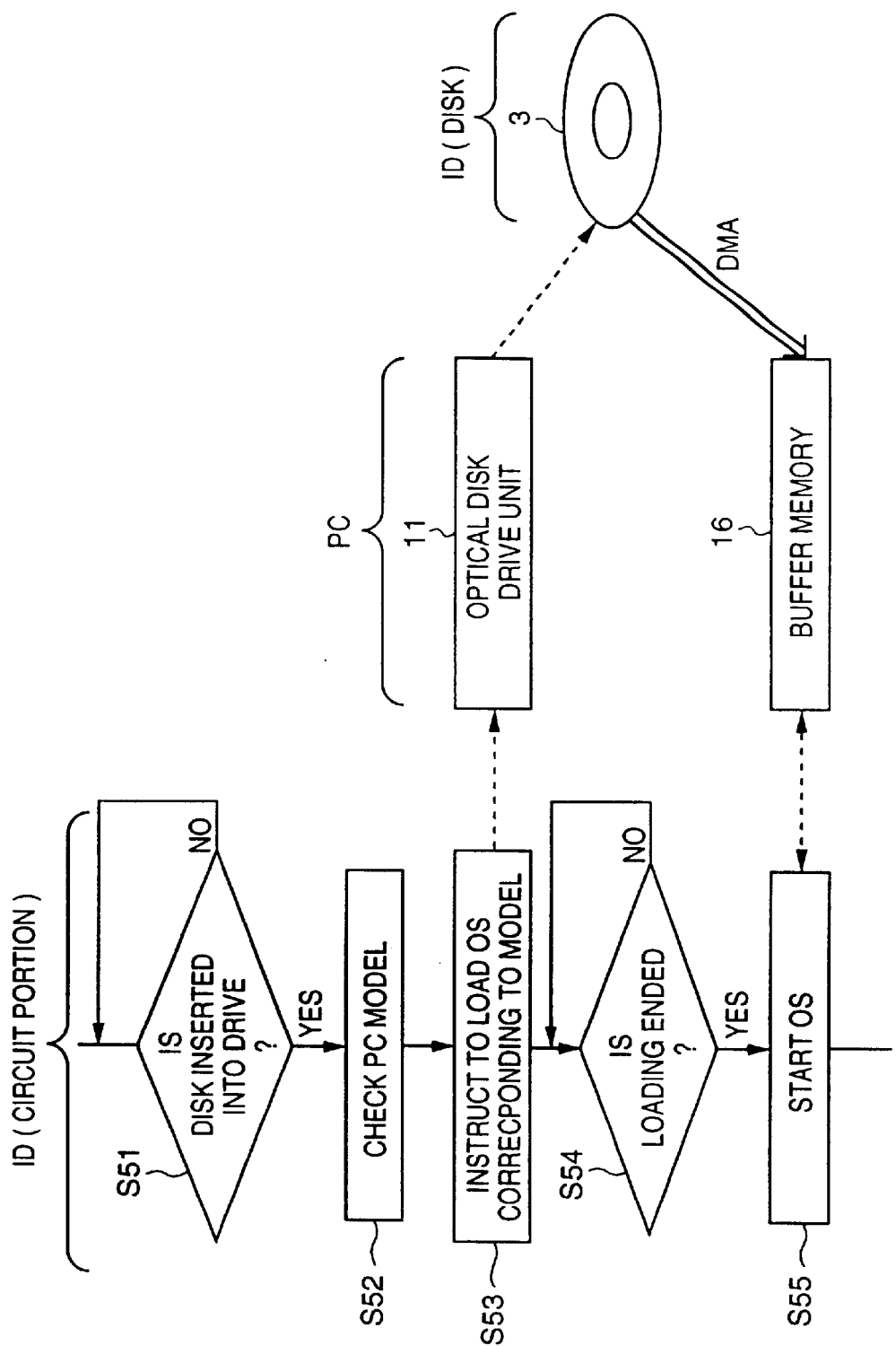
FIG. 5 is a flow chart showing an operation procedure in the system in FIG. 3.

FIG. 5 is a flow chart showing an operation procedure of the personal computer system. This example is a transitional embodiment in which an OS used until the system is standardized depends on the structure of the system.

The circuit portion 2 of the ID 1 checks at step S51 whether or not the ID 1 is inserted into the drive. If the ID 1 is inserted into the drive, the flow shifts to step S52 to check the model or the like of the system. Here, one of conventional personal computers may be used as the system even if only peripheral units are used. If only the peripheral units are used, the CPU 21 of the ID 1 checks the characteristics, capabilities, or the like of the peripheral units. If a personal computer is used, the CPU 21 checks the maker, type, version, and the like of the personal computer.

When the model or the sort of the personal computer is determined at step S52, an optimum OS corresponding to the model is selected to instruct the optical disk drive unit 11 to load the OS at step S53. The selected OS is loaded on a hard disk drive serving as the buffer memory 16 by, e.g., a DMA. The circuit portion 2 of the ID 1 waits for the end of loading at step S54. Upon completion of loading, the circuit portion 2 starts the OS at step S55.

Subsequently, an operation of the personal computer system controlled by the CPU 21 is realized.

Figure 6:
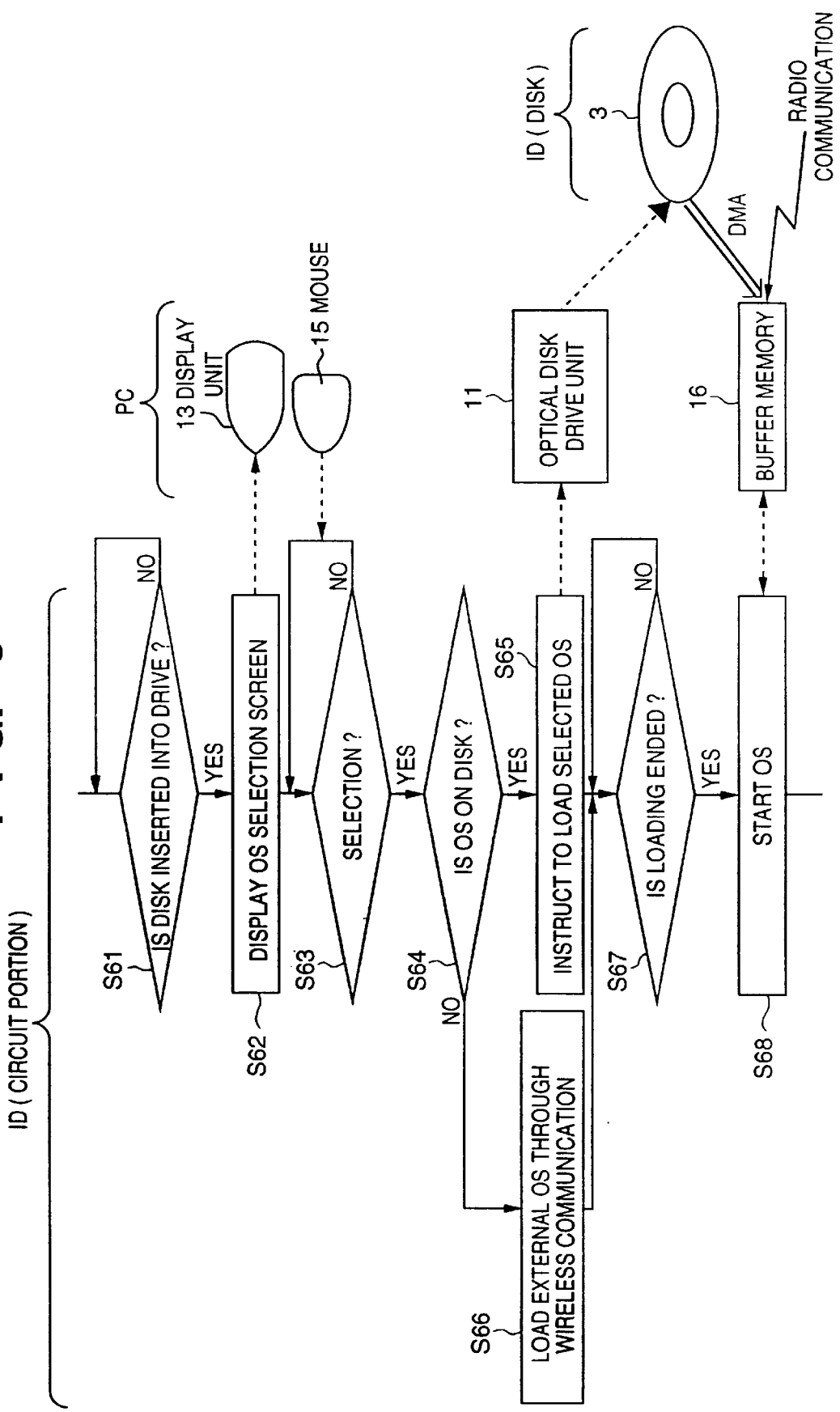
FIG. 6 is a flow chart showing another operation procedure in the system in FIG. 3.

FIG. 6 is a flow chart showing another operation procedure of the personal computer system. This example is an embodiment in which a system is standardized to be turned on as a system which is desired by a user.

The circuit portion 2 of the ID 1 checks whether or not the disk is inserted into the drive at step S61. If it is determined that the disk is inserted into the drive, the flow shifts to step S62 to output an instruction to the display unit 13 such that the selection screens of various existent OSs are displayed. In correspondence with a selection instruction of an OS desired by a user, the flow passes through step S63 to check at step S64 whether the OS selected by the use is present on the disk portion 3. If YES at step S64, the circuit portion 2 instructs the optical disk drive unit 11 to load the selected OS at step S65. The OS read from the disk portion 3 is loaded in the buffer memory 16 (hard disk drive) by a DMA. On the other hand, if no selected OS is present in the disk portion 3, the flow shifts to step S66 to connect the circuit portion 2 to the external host through the wireless communication unit 25 to download a desired OS.

The circuit portion 2 waits for the end of loading at step S67. Upon completion of loading, the circuit portion 2 starts the OS at step S68. In this case, as the place for storing the program, the buffer memory 16 or the RAM 23 of the ID may be used.

<ID Constructing car Navigation System>

Figure 7:
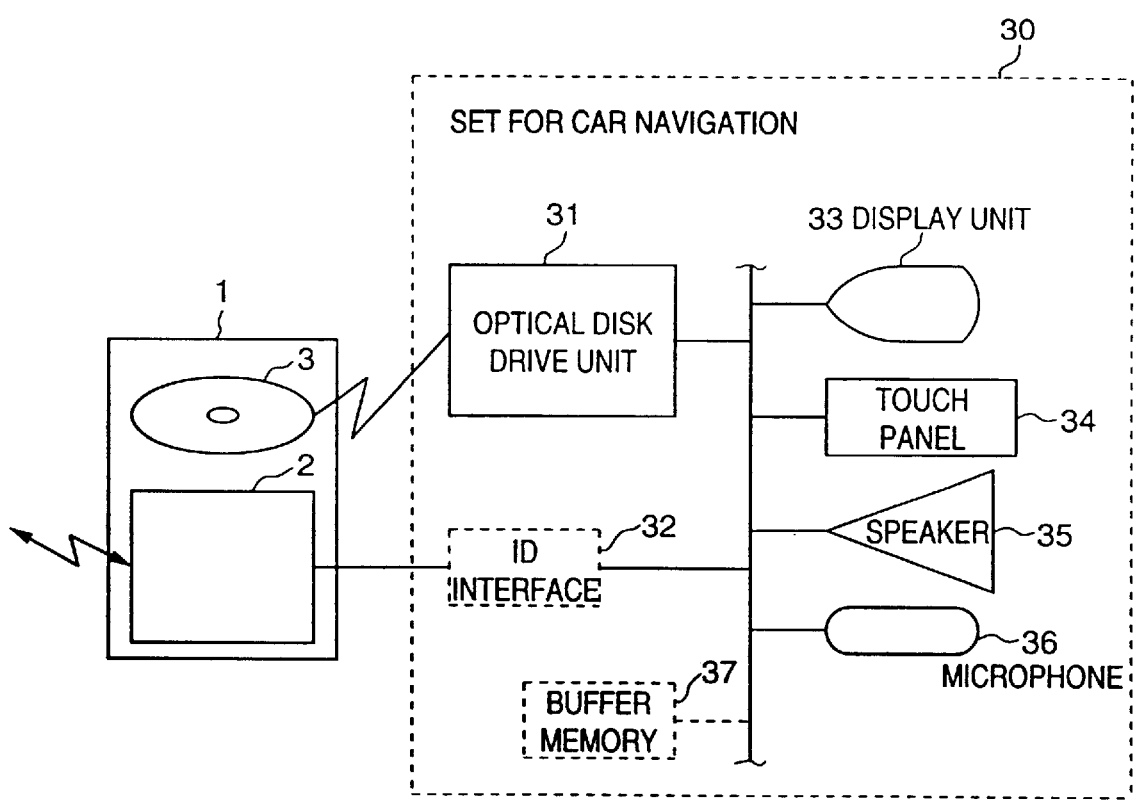
FIG. 7 is a view showing an arrangement of a car navigation system according to the embodiment.

FIG. 7 is a view showing an arrangement obtained when the ID according to this embodiment is applied to a car navigation system.

Referring to FIG. 7, in the car navigation system, an optical disk drive unit 31, a display unit 33, a touch panel 34, a loudspeaker 35 for outputting voice, and a microphone 36 for inputting voice are built. In this embodiment, the ID interface 32 and the buffer memory 37 are not necessary.

Figure 8:
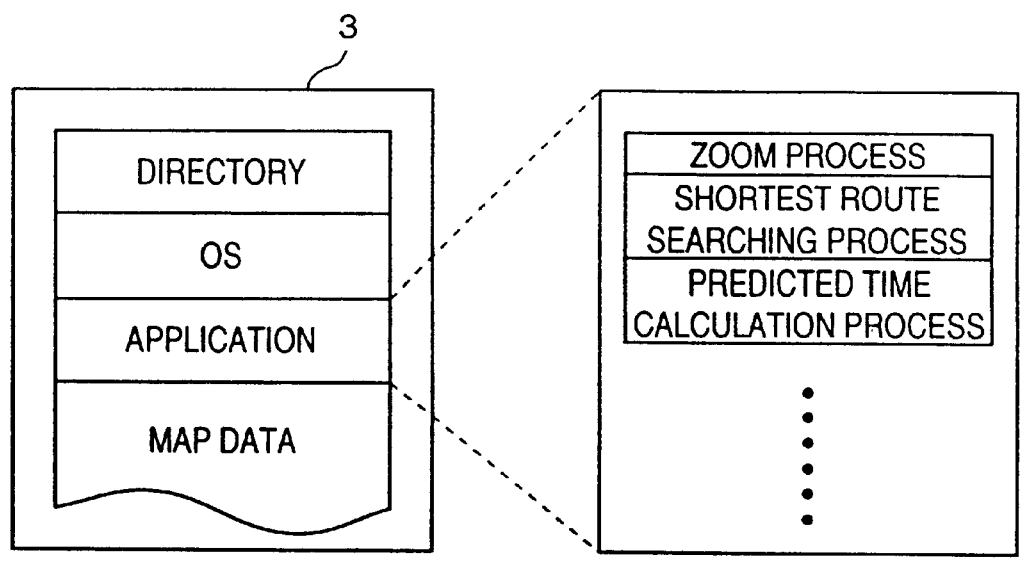
FIG. 8 is a view showing contents stored in the disk portion of an ID in the system in FIG. 7.

FIG. 8 shows data stored in a disk portion 3 of an ID in the car navigation system.

In the place pointed by the directory, an OS, an application, and map data are stored. As the application, an application for a zoom process, the shortest route searching process, the predicted time calculation process, and the like are included. In addition, the information may include catch programs such as information of resort places and weather forecast. In this embodiment, although one OS is used, a plurality of OSs may be used to cope with a plurality of systems. On the other hand, although not shown, the table of telephone numbers used by the ACU of a wireless communication unit 25.

Figure 9:
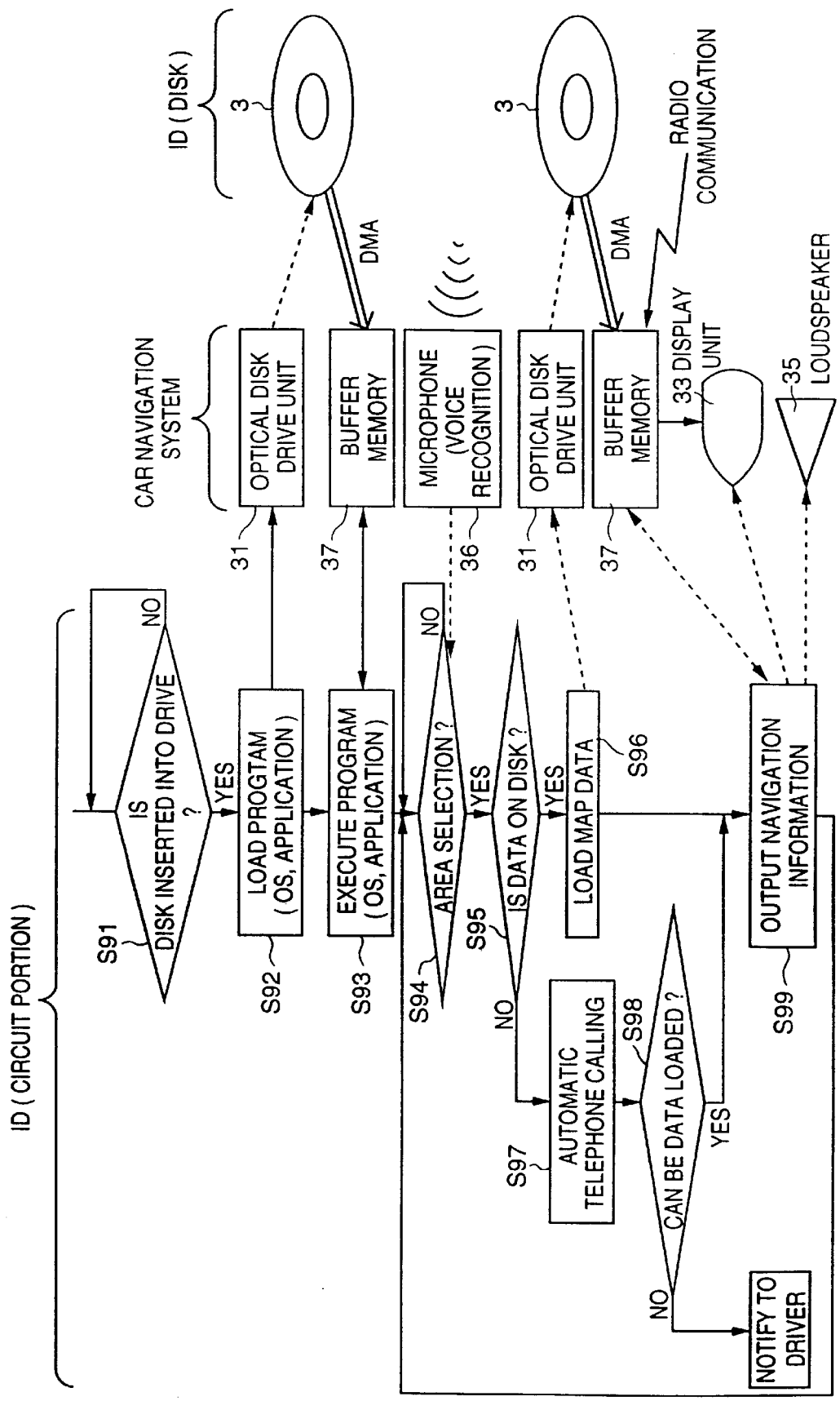
FIG. 9 is a flow chart showing an operation procedure in the system in FIG. 7.

FIG. 9 is a flow chart showing an operation of a car navigation system including an ID.

An intelligent circuit portion 2 of the ID 1 checks at step S91 whether the ID is inserted into a drive. If YES at step S91, the flow shifts to step S92 to instruct the disk drive unit to load an OS and a program. Although not shown in detail, after an actual initial selection display is performed, selection or the like of an application is executed, as described at steps S62 to S63 shown in FIG. 6, for example.

The optical disk drive unit 31 loads the program, which is selected from a disk portion 3 by a DMA, on the buffer memory 37 according to an instruction, and the circuit portion 2 executes the program at step S93.

At step S94, for example, area selection is performed. In this area selection, when an area, a destination, and the like are transmitted by voice through the microphone 36 for example, the voice is recognized to transmit the contents of the information to the circuit portion 2. The flow shifts to step S95 to check whether the selected map is on the disk portion 3. If YES at step S95, the circuit portion 2 instructs the optical disk drive unit 31 to load new map data, and the map data is read onto the buffer memory 37.

On the other hand, if the map is not on the disk, the flow shifts to step S97, the wireless communication unit 25 of the ID automatically performs dialing to telephone to the host. If data can be loaded, the data is downloaded from the host to the buffer memory 37. If data cannot be downloaded, a driver is notified that the data cannot be downloaded.

This automatic telephone dialing can also be used to obtain information such as traffic information or weather forecast by an instruction of the drive or an interrupt which is periodically input or input from an external device when various necessary telephone numbers are stored as a table. Although not described in this embodiment in detail, in addition to the information such as traffic information or weather forecast, merchant information such as a commercial message may be displayed.

When the map data is loaded, navigation information is output to the display unit 33 and/or the loudspeaker 35 by using the OS, application, program, and map data on the buffer memory 37 at step S99.

The map data is updated in accordance with an instruction of the driver or the movement of the automobile position.

<ID Constructing Automatic Selling and Settlement System>

FIG. 10 is a view showing an arrangement of an automatic selling and settlement system using an ID according to this embodiment. This embodiment describes a case wherein all functions are effected by one ID. However, an inexpensive ID card for selling merchandise and a personally owned ID card for settlement can be separated from each other. In addition, although this system exemplifies a case in which a television set is used, the system may be realized by a portable telephone/ID device constituted by an ID drive unit, an LCD display unit, a keyboard (or touch panel).

Referring to FIG. 10, a television set 42 is used as the display unit for the ID, and selection and instruction are performed on the television screen by a remote controller 43.

Figure 11:
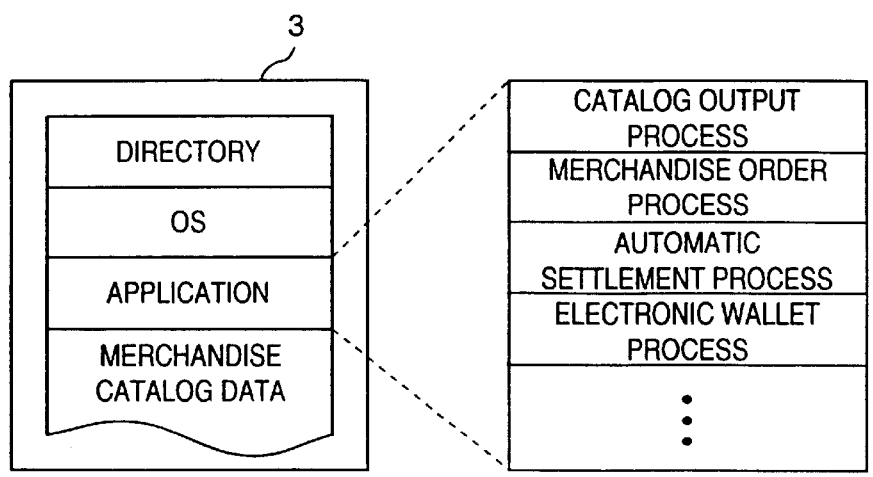
FIG. 11 is a view showing contents stored in the disk portion of the ID in the system in FIG. 10.

FIG. 11 is a view showing an arrangement of data stored in the ID disk portion 3 in this system.

An OS, an application, merchandise catalog data are stored on a place pointed by a directory. As the merchandise catalog data, order telephone numbers and the like for respective pieces of merchandises are also stored. In addition, personal information such as sizes of shoes and clothes required for order may also be stored. As the application, for example, an application for a catalog output process for outputting a catalog onto a television screen, an application for a merchandise order process for automatically ordering a piece of merchandise selected by a user to a maker to send the order report to a credit company, an application for an automatic settlement process for using the ID as a credit card, an application for an electronic wallet process for using the ID as an electronic wallet for electronic money, or the like is stored.

The plurality of applications are stored in one ID, the catalog output process, the merchandise order process, the automatic settlement process, the electronic wallet process must be independently performed to keep secret, and are completely separated from other processes. Similarly, data used by these processes are managed such that separate portions completely separated from a shared portion coexist. In the above system, although not specifically described, the same management as described above must be performed between a plurality of OSs in the system in FIG. 3 such that the programs or data of the OSs are not broken. This is realized by using digital signature or personal identification number technique.

Figure 12:
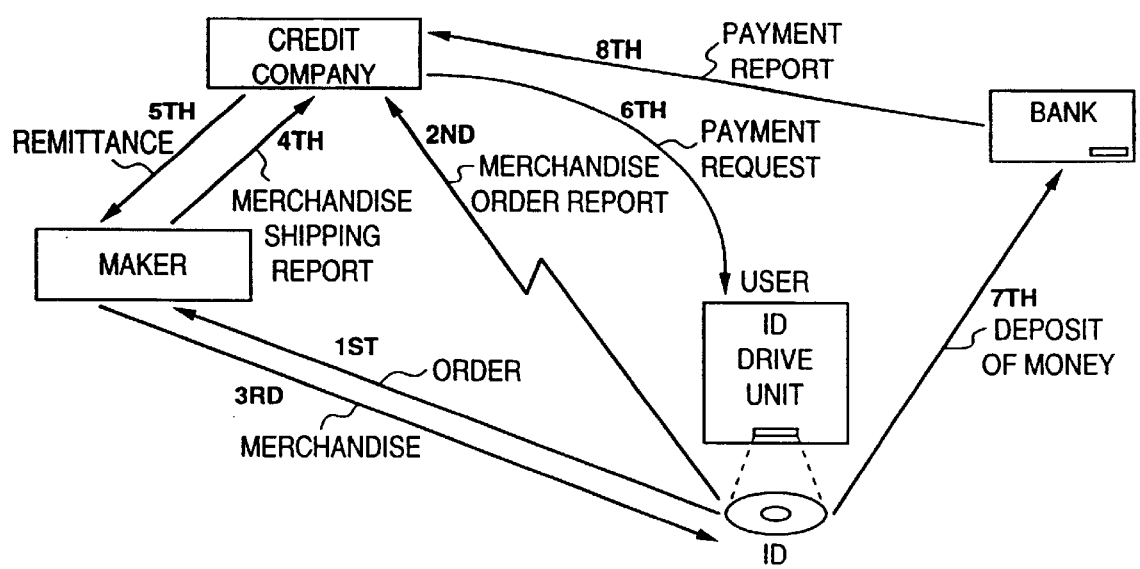
FIG. 12 is a view showing an automatic selling and settlement procedure in the system in FIG. 10.

FIG. 12 is a schematic view showing a series of procedures performed from when a piece of merchandise is ordered by this system to when settlement is completed.

In a user ID device in which an IC card is inserted, a merchandise catalog stored in the disk portion 3 is displayed, and a user selects a piece of desired merchandise. In this case, the circuit portion of the ID card performs automatic dialing to the maker of merchandise by using the wireless communication unit 25 (1st). When this order is accepted, the ID card performs automatic dialing to a credit company to be used, and a report representing that the order is completed (2nd). When the maker ships the ordered merchandise (3rd), the maker sends a report that the merchandise is shipped (4th). The credit company receives this report to send remittance to the maker (5th) and requests the user of payment (6th). The user who receives the bill and pays money into the account of the credit company by the automatic settlement function or electronic wallet function of the IC card (7th), the bank reports the completion of payment to the credit company (8th), and the series of selling and settlement processes are completed.

Figure 13:
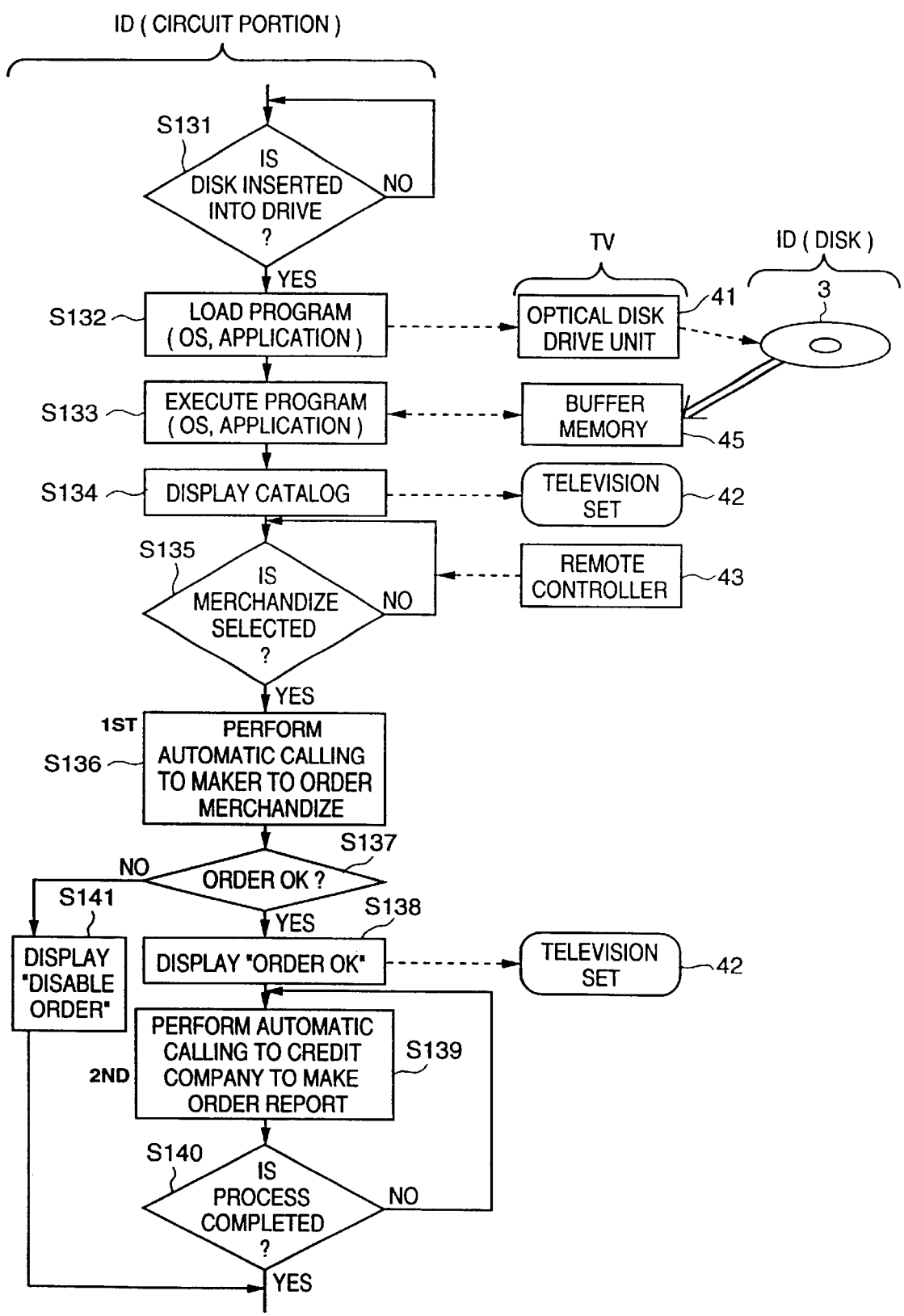
FIG. 13 is a flow chart showing an operation procedure in the system in FIG. 10.

FIG. 13 is a flow chart showing an operation procedure of, especially, an order process of the series of processes.

The circuit portion checks insertion of the ID into a drive at step S131. If YES at step S131, the circuit portion instructs a drive unit to load an OS and a desired application from the disk portion 3 at step S132. Note that selection of applications is realized as at steps S62 and S63 in FIG. 6 described above.

An optical disk drive unit 41 transfers the designated programs and catalog data to a buffer memory 45 of the TV set or the RAM 23 of the ID 1 at step S133. The circuit portion 2 of the ID 1 instructs the television set 42 to display the catalog at step S134. Although the process for selecting a display catalog must be performed before the catalog is displayed, a description of the selection process will be omitted.

When merchandise selection is performed by a remote controller 43 of a user at step S135 to select a piece of merchandise, the circuit portion sends the telephone number of a corresponding maker to the wireless communication unit 25 to perform automatic dialing at step S136, thereby automatically ordering the selected merchandise. When the order is accepted by the maker, the flow shifts from step S137 to step S138 to display "order OK" on the television set 42 and to record completion of order on the disk portion 3 or the RAM 23. At steps S139 and S140, automatic dialing and order report performed to a credit company to be used.

On the other hand, if the order is not accepted, the flow shifts to step S141 to display "disable order".

As an example similar to this system, an automatic reserving system for recording television programs is considered. In this case, television program data for one week or the like is stored in place of the merchandise catalog data in FIG. 3. As applications, an application for a television program display process, an application for a television program recording reserve process, an application for a recording management process, and the like are stored.

By using the above ID, computer makers are released from oligopoly control of CPUs and OSs, and an ID in which a CPU optimum for respective pieces of software is mounted, is available from software makers. In addition, hardware makers can terminate unprofitable business wherein model changes must be performed three or four times a year according to frequent improvement of CPU.

Users can enjoy improved utility by using ID. For example, unless available software is temporarily copied from a CD-ROM or the like onto a hard disk, the utility of the software utility is degraded. For this reason, the hard disk is easily made full, and another hard disk must be added, or the computer itself must be changed. However, when the ID is used, another hard disk or a new computer are not necessary, and trouble caused by an attaching/detaching process can be avoided.

More specifically, according to this ID, the ID can flexibly cope with changes in specification such as improvement of a CPU, and a situation, which considerably damages the utility for a user, i.e., failure in the compatibility of pieces of hardware caused by the difference between OSs or formats, can be avoided. By using this ID, hardware which has been regarded as a computer itself can be regarded as a simple man-machine interface (a so-called combination of a display, a keyboard, and the like), and the hardware is considered as home electronics such as a TV or a VTR, i.e., durable goods. Therefore, utility for the users is considerably improved, and makers increase additional values by devising designs and functions.

In addition, the waste disposal of computers at present has posed social problems. These problems are caused by excessive model changes in the computer industry in which a model becomes obsolescent within an average of three months. The ID according to the present invention removes the causes of the problems and releases the computer industry from oligopoly control to considerably improve the utility for users.

Although not described in this embodiment, an ID-GAME obtained by combining a game-dedicated CPU and various pieces of game software can be available.

When the ID according to this embodiment is combined with various functions as a multi-functional ID card, a more effective storage medium can be obtained.

According to the present invention, a storage medium having an electronic circuit portion serves as a central unit, and a main body serves as a peripheral unit, so that a system which is required by an owner of the storage medium can be arbitrarily constructed and a computer system having the storage medium, for example, a personal computer, a car navigation system, a multi-functional television set, or the like can be provided.

The present invention has been described with reference to the preferable embodiments. However, the present invention is not limited to the above embodiments, and various modifications can be effected within the spirit and scope of the invention.

What is claimed is:

1. A storage medium for use as a removable disk, comprising: a pair of layers,
    wherein one of the pair of layers has an optically recordable or recorded surface and is used as an information recording portion for storing information, and
    another of the pair of layers has no recordable or recorded surface and is used as an electronic circuit portion for processing information to control an external device,
    wherein a plurality of operating systems are stored in the information recording portion, and said electronic circuit portion has determination means for determining the characteristics of said external device, selecting means for selecting one of the plurality of operating systems to be executed in correspondence with a determination result of said determination means, and control means for executing the selected operating system to control said external device.

2. A storage medium for use as a removable disk, comprising; a pair of layers, wherein one of the pair of layers has an optically recordable or recorded surface and is used as an information recording portion for storing information, and another of the pair of layers has no recordable or recorded surface and is used as an electronic circuit portion for processing information to control an external device, wherein said information recording portion stores a plurality of operating systems, and said electronic circuit portion comprises display instruction means for causing said external device to selectively display the plurality of operating systems, selecting means for selecting one of the plurality of operating systems to be executed in correspondence with selection instruction, and control means for executing the selected operating system to control said external device.

3. An optical disk comprising: a pair of layers, wherein one of the pair of layers has an optically recordable or recorded surface and is used as an information recording portion for storing information, and another of the pair of layers has no recordable or recorded surface and is used as an electronic circuit portion for processing information to control an external device, wherein a plurality of operating programs are stored in the information recording portion, and said electronic circuit portion has determination means for determining the characteristics of said external device, selecting means for selecting one of the plurality of operating systems to be executed in correspondence with a determination result of said determination means, and control means for executing the selected operating system to control said external device.

4. A computer system, comprising a storage medium for use as a removable disk, said storage medium having an information recording portion for storing information and an electronic circuit portion for processing information to control said computer system, wherein a plurality of operating systems are stored in said information recording portion, and said electronic circuit portion has determination means for determining the characteristics of said computer system, selecting means for selecting one of the plurality of operating systems to be executed in correspondence with a determination result of said determination means, and control means for executing the selected operating system to control said computer system.

5. A computer system, comprising a storage medium for use as a removable disk, said storage medium having an information recording portion for storing information and an electronic circuit portion for processing information to control said computer system, wherein said information recording portion stores a plurality of operating systems, and said electronic circuit portion comprises display instruction means for causing said computer system to selectively display the plurality of operating systems, selecting means for selecting one of the plurality of operating systems to be executed in correspondence with selection instruction, and control means for executing the selected operating system to control said computer system.

* * * * *